(12) United States Patent
Cai et al.

(10) Patent No.: US 10,447,833 B2
(45) Date of Patent: Oct. 15, 2019

(54) MOBILE TELEPHONE SUPPORT FRAME

(71) Applicants: Beijing VGO Co., Ltd., Beijing (CN); Shenzhen Qianhai AutoBot Co., Ltd., Shenzhen (CN)

(72) Inventors: Liang Cai, Beijing (CN); Yawei Hao, Beijing (CN)

(73) Assignees: BEIJING VGO CO., LTD., Beijing (CN); SHENZHEN QIANHAI AUTOBOT CO., LTD., Shenzhen (CN)

( * ) Notice: Subject to any disclaimer, the term of this patent is extended or adjusted under 35 U.S.C. 154(b) by 0 days.

(21) Appl. No.: 16/066,010

(22) PCT Filed: Nov. 4, 2016

(86) PCT No.: PCT/CN2016/104770
§ 371 (c)(1),
(2) Date: Jun. 25, 2018

(87) PCT Pub. No.: WO2017/140128
PCT Pub. Date: Aug. 24, 2017

(65) Prior Publication Data
US 2019/0014203 A1    Jan. 10, 2019

(30) Foreign Application Priority Data

Feb. 19, 2016    (CN) .................... 2016 2 0131508 U

(51) Int. Cl.
*H04M 1/12*    (2006.01)
*B60R 11/02*    (2006.01)
(Continued)

(52) U.S. Cl.
CPC ........... *H04M 1/12* (2013.01); *B60R 11/0241* (2013.01); *H04M 1/04* (2013.01); *B60R 2011/0071* (2013.01); *H04M 1/6075* (2013.01)

(58) Field of Classification Search
CPC ........ H04M 1/12; H04M 1/04; H04M 1/6075; B60R 11/0241; B60R 2011/0071;
(Continued)

(56) References Cited

U.S. PATENT DOCUMENTS 8,544,161 B2 * 10/2013 Carnevali ........... B60R 11/0235
248/346.04
2012/0317776 A1 * 12/2012 Carnevali ........... B60R 11/0235
29/428

(Continued)

FOREIGN PATENT DOCUMENTS

CN    202268930 U    6/2012
CN    203563106 U    4/2014
(Continued)

*Primary Examiner* — Tuan D Nguyen
(74) *Attorney, Agent, or Firm* — Cantor Colburn LLP

(57) ABSTRACT

The present application relates to technical field of mobile telephone accessory, and particularly to a mobile telephone support frame including main support adjusting arms and mobile telephone arms connected with each other, the number of main support adjusting arms and mobile telephone arms are two, the mobile telephone support frame further includes two driven arms arranged each another symmetrically, the driven arms are located between main support adjusting arms and mobile telephone arms, the main support adjusting arms include rotating ends which are rotationally connected, the two driven arms are respectively mounted on the two main support adjusting arms, one end of the two driven arms is rotationally connected, the other end is respectively connected to the two mobile telephone arms. The size adjustment for mobile telephone support frame is faster and more convenient, and it can reduce operating costs and facilitate to use in the automobile environment.

13 Claims, 3 Drawing Sheets

(51) Int. Cl.
*H04M 1/04* (2006.01)
*B60R 11/00* (2006.01)
*H04M 1/60* (2006.01)

(58) Field of Classification Search
CPC ........ F16M 11/10; F16M 11/12; F16M 11/18; F16M 13/02; F16M 13/022
USPC ..................................................... 455/575.1
See application file for complete search history.

(56) References Cited

U.S. PATENT DOCUMENTS

| | | | |
|---|---|---|---|
| 2013/0175426 A1* | 7/2013 | Harjani | F16M 11/041 248/688 |
| 2013/0233986 A1* | 9/2013 | Rasheta | G03B 17/561 248/205.1 |
| 2014/0246551 A1* | 9/2014 | Springer | F16M 11/041 248/276.1 |
| 2014/0263939 A1* | 9/2014 | Rinner | F16M 11/10 248/688 |

FOREIGN PATENT DOCUMENTS

| | | |
|---|---|---|
| CN | 204859272 U | 12/2015 |
| CN | 205566432 U | 9/2016 |

* cited by examiner

MOBILE TELEPHONE SUPPORT FRAME

CROSS-REFERENCE TO RELATED APPLICATION

The present application claims priority to Chinese patent application no. 201620131508X, entitled "Mobile Telephone Support Frame", and filed to the State Intellectual Property Office of China on Feb. 19, 2016, which is incorporated herein by reference in its entirety.

TECHNICAL FIELD

The present application relates to the technical field of mobile telephone accessory, and particularly to a mobile telephone support frame.

BACKGROUND

With the development of scientific technology, mobile telephones have become an indispensable communication tools in people's life. The number of functions for the existing smart mobile telephones is increasing. The mobile telephone not only plays a role of communication tool, but also of microcomputer. However, all of activities from the mobile telephone require people to hold it on hand for long time, if so, people will feel uncomfortable in arms, and especially when driving, the driver cannot hold a mobile telephone with hand directly. Therefore, a lot of mobile telephone support frames appear in the related art, so as to meet people's using requirements. At present, the mobile telephone industry is booming, and the mobile telephones with various models, brands and sizes are active in the market. The existing mobile telephone support frames are produced to consist with different kind of mobile telephone, thereby wasting many resources, such that there is no single mobile telephone support frame for general use. In order to solve this technical problem, an adjustable mobile telephone support frame, which is adapted to use for the mobile telephones with various models and sizes, appears in the related art, for example, the Chinese patent application with patent no. 201520620544.8 discloses an on-board smart mobile telephone support frame, including a fixing plug pin, a main shaft, main support adjusting arm rods, front support arms, adjusting arm rod locking knobs and support arm locking knobs, wherein two main support adjusting arm rods are expanded in a scissors form with the main shaft as an axis, the main support adjusting arm rods and the front support arms are hinged at end portion, the support arm locking knobs are mounted on a back surface of hinging place, the adjusting arm rod locking knobs are mounted on a back surface of the main shaft, the fixing plug pin is coaxially turn-locked with the main shaft, and unequal cross plug slots are provided on the back surface of the fixing plug pin. The advantages of above application in that: the mobile telephone can be plugged and taken conveniently after the support frame is adjusted; an automobile air conditioner vent is within a range in which the driver's arm can be stretched conveniently and then the driver can operate the mobile telephone comfortably; the support frame ensures that the mobile telephone is close to an inclined angle of the automobile air conditioner vent and is matched with an angle of the driver viewing the mobile telephone, meanwhile, the fixing place of the mobile telephone does not cover the front windshield of car, thus there is no potential safety hazard; the support frame is easy to mount on the automobile and dismantled therefrom. However, two arms in the design of this arm-type support frame need to be operated separately, to adjust the angle and distance thereof, in addition the mobile telephone needs to be fixed manually, thus the operations thereof are complicated.

It can be seen that an urgent technical problem to be solved for a person skilled in the art is to provide an improved mobile telephone support frame regarding the shortcomings in the related art, such that it is easy to be operated and used, and can serve functions of supporting and fixing the mobile telephones with different models and sizes, while the mobile telephones do not need to be fixed through manual operations.

SUMMARY

In order to solve the above technical problems, the present application provides a mobile telephone support frame, which has such a structure that the left and right mobile telephone arms can shift simultaneously and are always expanded in parallel state, thus the operation for the mobile telephone support frame is faster and more convenient.

In order to achieve the above technical effects, the present application includes the following technical solutions:

A mobile telephone support frame includes main support adjusting arms and mobile telephone arms connected with each other, the number of the main support adjusting arms and the number of the mobile telephone arms being both two, the mobile telephone support frame further includes two driven arms arranged one another symmetrically, the driven arms are located between the main support adjusting arms and the mobile telephone arms, the main support adjusting arms include rotating ends, the two rotating ends are rotationally connected, the two driven arms are respectively mounted on the two main support adjusting arms, one end of the two driven arms is rotationally connected, and the other end is respectively connected to the two mobile telephone arms.

Furthermore, the mobile telephone support frame further includes a fixing part.

The main support adjusting arms further include a fixing ends, the fixing ends are connected to one end of the mobile telephone arms; one side of the two main support adjusting arms facing the mobile telephone arms is provided with a limit groove, and the two driven arms are respectively located into the two limit grooves.

The other end of the mobile telephone arms is provided with a holding groove.

One end of the driven arms is connected to the mobile telephone arms, the other end is provided with gears, and the gears of the two driven arms are matched and connected each other, and located on the rotating ends.

The fixing part is respectively connected to ends of the driven arms provided with the gears and the rotating ends. By positioning the mobile telephone arms through a pair of driven arms interconnected by the gears, it can ensure that the mobile telephone arms are always parallel to and synchronized with each other in process of expanding and shifting, and by fixing the mobile telephone arms through the driven arms, the mobile telephone arms do not need to be manually locked, thus reducing the operating costs, and the mobile telephone arms are always parallel to each other and move simultaneously in the shifting process, thus the adjustment is faster, and it is convenient to operate by one hand.

Furthermore, the middle portions of the two mobile telephone arms are symmetrical with each other and bent towards a symmetry axis in a braided bent shape, and the holding grooves face to the driven arms.

The mobile telephone is placed on the mobile telephone support frame of the present application, such that the bottom portion of the mobile telephone is located on the holding grooves, and the holding grooves serve a supporting function to the mobile telephone, meanwhile, the mobile telephone is located between the two mobile telephone arms, and left and right sides of the mobile telephone contact with the bent portions formed by the braided bent shapes which are symmetrical with each other, thus the bent portions serve a supporting function to the mobile telephone, and thus realizing the support and placement of the mobile telephone by the mobile telephone arms.

Furthermore, the limit grooves are L-shape grooves, and the driven arms adhere to the L-shape grooves.

The disposition of the limit grooves enables the driven arms, the mobile telephone arms and the main support adjusting arms to be interconnected, moreover, the appearance is more pleasing and the space is saved.

Furthermore, the fixing part comprises a fixing plate, a limit part and a rotating shaft, the limit part and the rotating shaft are fixedly connected to the same side of the fixing plate, the rotating shaft has one end fixedly connected on the fixing plate, and the other end passing through the two rotating ends, such that the two rotating ends are connected through the rotating shaft, one end of the driven arms provided with the gears is connected to the fixing part, and the limit part is located in a rotating range of the driven arms.

The two driven arms are interconnected by the design of the gears. The two driven arms are expanded in a scissors form by the gears. The limit part is located in the rotating range of the driven arms, and limits angles of expansion of the driven arms within 180°.

Furthermore, the limit part is a boarding plate, the boarding plate is fixedly mounted on an edge of the fixing plate, the boarding plate is a U shape, and an opening of the U shape faces to the fixing ends of the main support adjusting arms.

Furthermore, one end of the driven arms provided with the gears is provided with a protrusion, one side of the fixing plate facing the driven arms is provided with a groove matched with the protrusion, and the protrusion is mounted into the groove, such that the two driven arms are respectively expanded in a scissors form about the protrusion as an axis at the opening of U shape.

Furthermore, the driven arms are located between the fixing plate and the main support adjusting arms.

Furthermore, the fixing part further includes a cover plate, and the rotating shaft passes through the rotating end to be connected with the cover plate, thus the fixing plate, the driven arms and the main support adjusting arms are fixedly connected in turn.

Furthermore, the mobile telephone support frame further includes a fixing seat, and the fixing seat is detachably connected to the cover plate.

Fixing seats of various styles and shapes can be mounted according to the requirement, so as to be fixed at different places. The mobile telephone support frame of the present application has a broad range of uses and strong practicability, and can be correspondingly connected with the fixing seats according to the personalized demands of customers, thus it is convenient to use.

Furthermore, the fixing ends are connected to one end of the mobile telephone arms through locking knobs, and the locking knobs pass through the fixing ends and form threaded connection with one end of the mobile telephone arms.

The following beneficial technical effects can be achieved by adopting the above technical solutions: the size adjustment of the mobile telephone support frame of the present application is faster and more convenient, and it can be adjusted by one hand, moreover, by fixing the mobile telephone arms through the driven arms, the mobile telephone arms do not need to be manually locked, thus reducing operating costs and facilitating to use in the automobile environment.

BRIEF DESCRIPTION OF THE DRAWINGS

In order to illustrate technical solutions of examples of the present disclosure more clearly, accompanying drawings which need to be used in the description of the examples will be briefly described below. Apparently, the accompanying drawings described in the following are merely for some examples of the present disclosure, and a person ordinarily skilled in the art still can obtain other accompanying drawings according to these accompanying drawings without paying out inventive efforts.

DETAILED DESCRIPTION

The present application is further described in detail through specific embodiments in combination with accompanying drawings.

Figure 1:
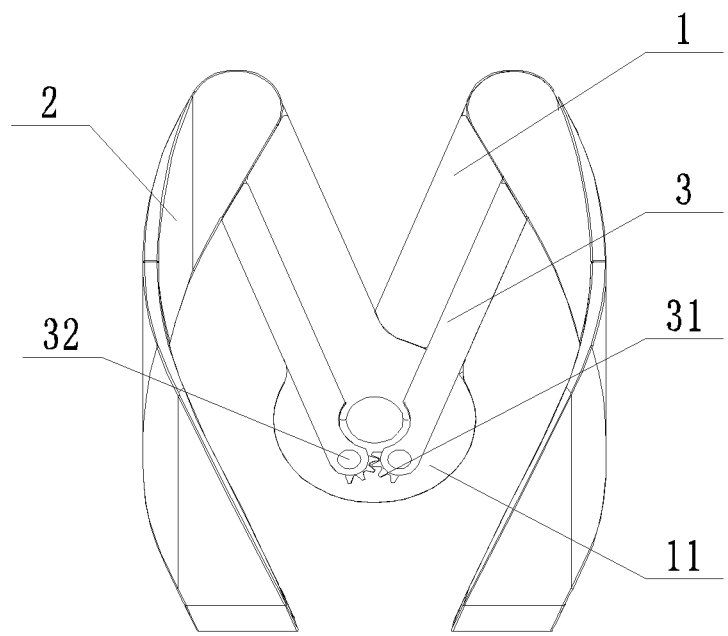
FIG. 1 is a structural schematic view of a mobile telephone support frame of Embodiment 1 of the present application.

Embodiment 1: as shown in FIG. 1, a mobile telephone support frame includes main support adjusting arms 1 and mobile telephone arms 2 connected with each other, wherein the number of the main support adjusting arms as well as the number of the mobile telephone arms are two respectively. The mobile telephone support frame further includes two driven arms 3 arranged each other symmetrically, and the driven arms are located between the main support adjusting arms and the mobile telephone arms. The main support adjusting arms include rotating ends 11, and two rotating ends are rotationally connected. The two driven arms are mounted on two main support adjusting arms respectively, and one end of the two driven arms is rotationally connected, and the other end is connected to the two mobile telephone arms respectively.

Figure 2:
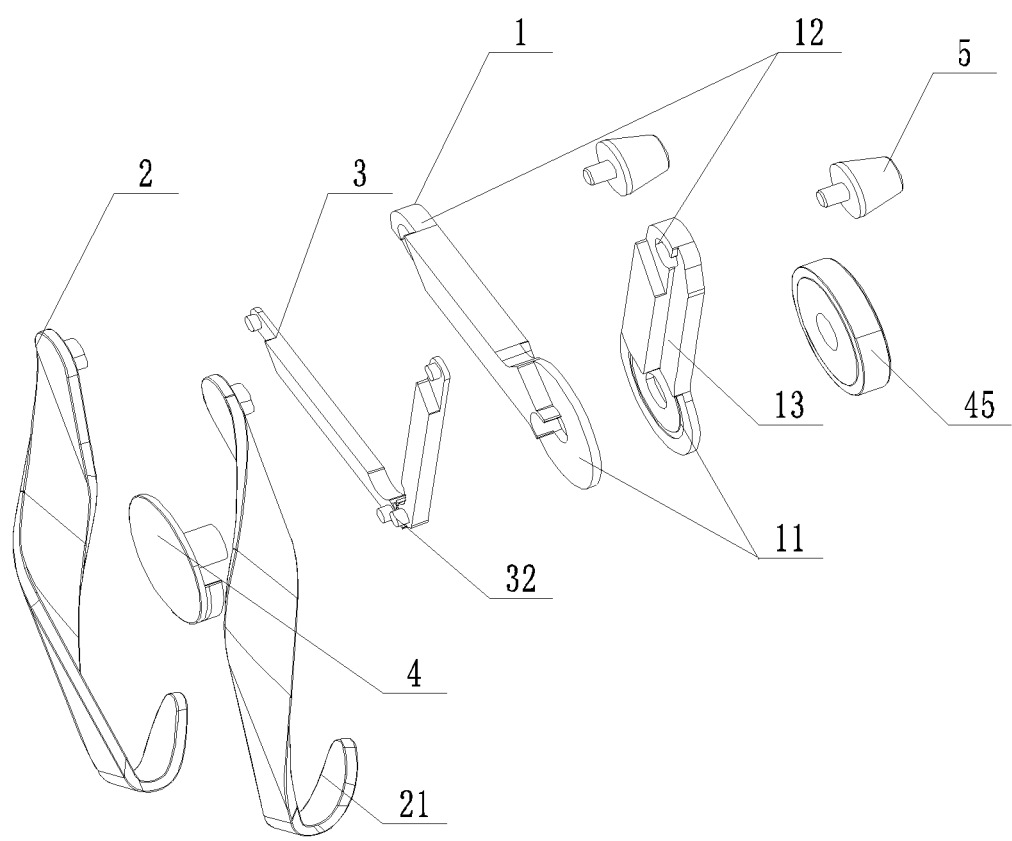
FIG. 2 is a structural exploded view of a mobile telephone support frame of Embodiment 2 and Embodiment 3 of the present application.
Figure 3:
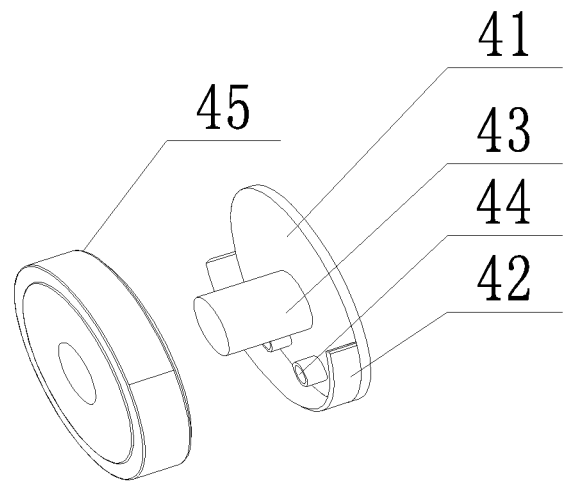
FIG. 3 is a structural exploded view of a fixing plate of the present application.
Figure 4:
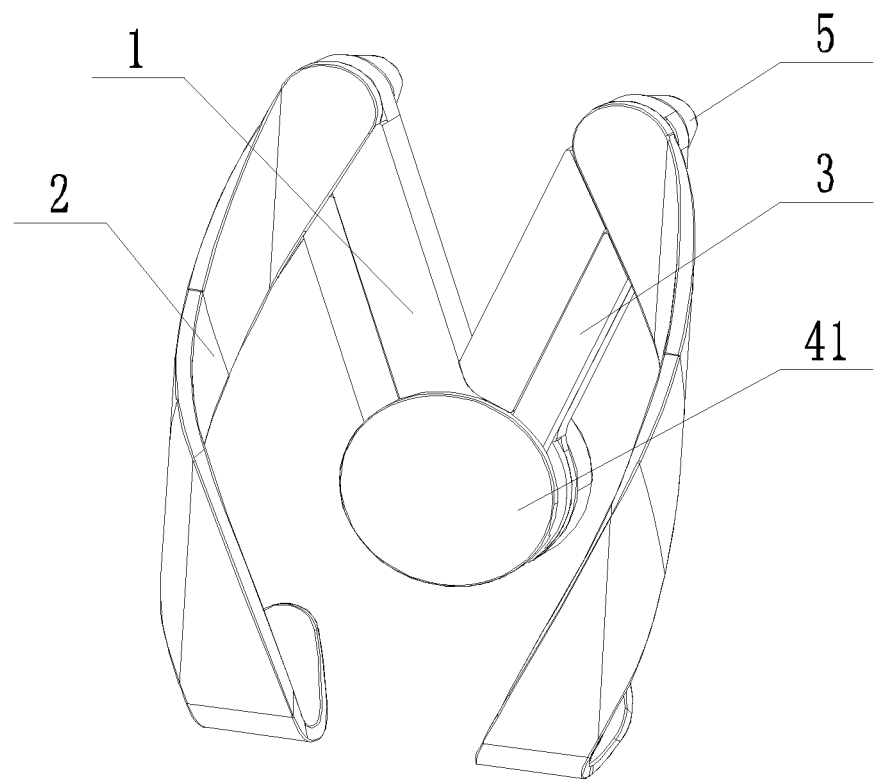
FIG. 4 is a front stereoscopic view of the mobile telephone support frame of Embodiment 2 and Embodiment 3 of the present application.
Figure 5:
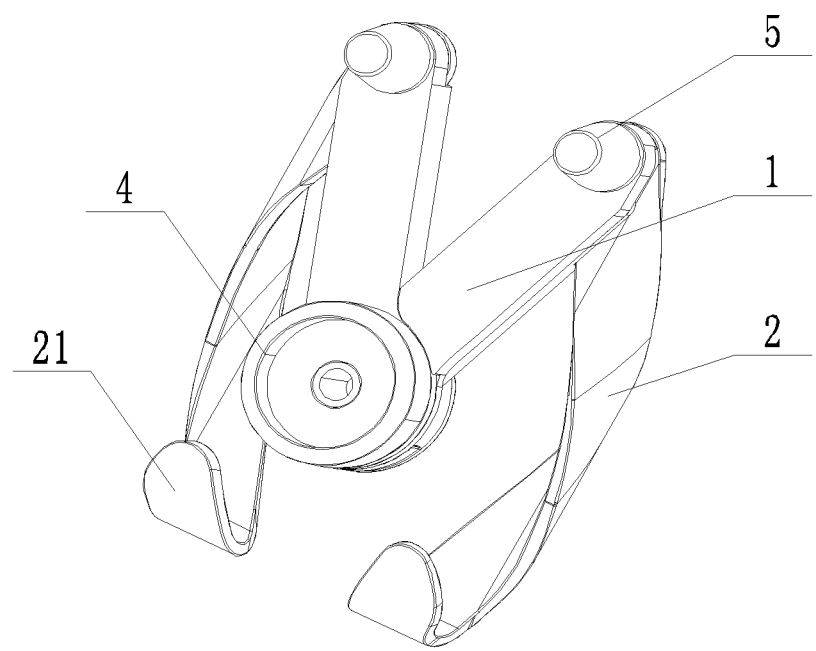
FIG. 5 is a rear stereoscopic view of the mobile telephone support frame of FIG. 4 of the present application.
Figure 6:
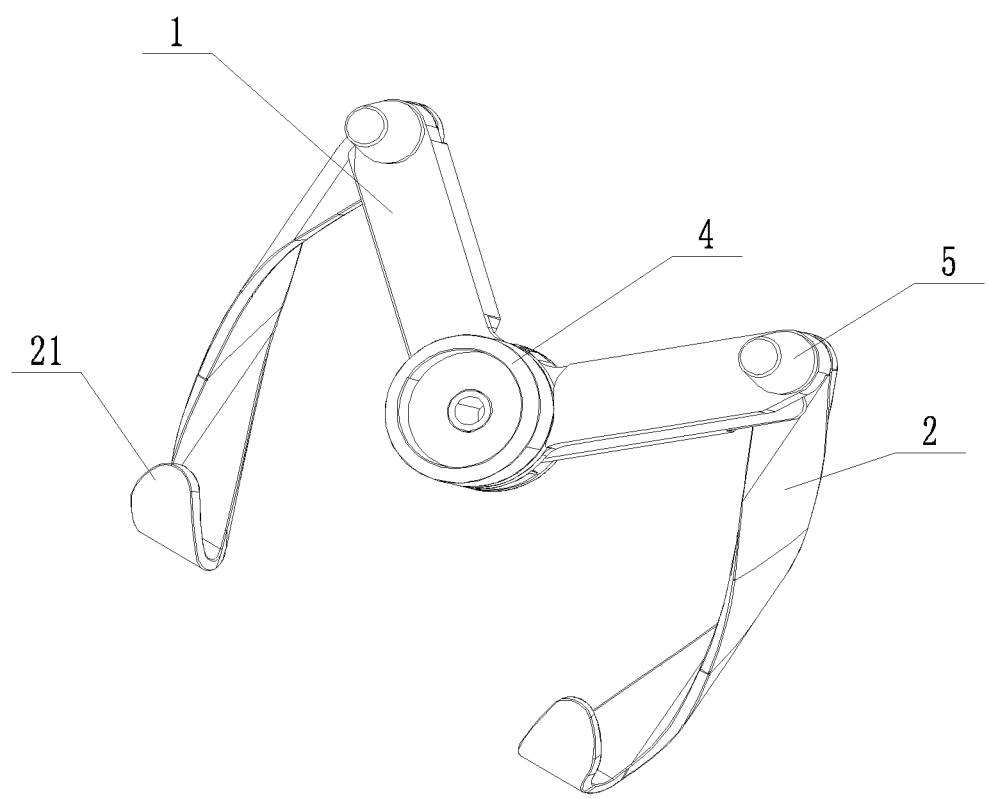
FIG. 6 is a stereoscopic view of the mobile telephone support frame which is expanded of FIG. 5 of the present application.

Embodiment 2: as shown in FIG. 1 and FIG. 2, a mobile telephone support frame includes main support adjusting arms 1 and mobile telephone arms 2 which are connected with each other, wherein the number of the main support adjusting arms and the number of the mobile telephone arms are both two. The mobile telephone support frame further includes two driven arms 3 arranged each other symmetrically, and the driven arms are located between the main support adjusting arms and the mobile telephone arms. The main support adjusting arms include rotating ends 11, and two rotating ends are connected rotationally. The two driven arms are mounted on the two main support adjusting arms respectively, and one end of the two driven arms is connected rotationally, and other end is connected to the two mobile telephone arms respectively.

The mobile telephone support frame further includes a fixing part 4.

The main support adjusting arms further include fixing ends 12, the fixing ends are connected to one end of the mobile telephone arms; one side of the two main support adjusting arms facing the mobile telephone arms is provided with limit groove 13, and the two driven arms are located in the two limit grooves respectively.

The other end of the mobile telephone arms is provided with holding groove 21.

One end of the driven arms is connected to the mobile telephone arms, and the other end thereof is provided with gears 31, and the gears of the two driven arms are matched and connected each other, and located on the rotating ends.

The fixing part is connected to the ends of the driven arms provided with the gears and the rotating ends respectively.

Embodiment 3: as shown in FIGS. 1 to 6, a mobile telephone support frame includes main support adjusting arms 1 and mobile telephone arms 2 connected with each other, wherein the number of the main support adjusting arms and the number of the mobile telephone arms are both two. The mobile telephone support frame further includes two driven arms 3 arranged each another symmetrically, and the driven arms are located between the main support adjusting arms and the mobile telephone arms. The main support adjusting arms include rotating ends 11, and two rotating ends are connected rotationally. The two driven arms are mounted on the two main support adjusting arms respectively, and one end of the two driven arms is connected rotationally, and other end thereof is connected to the two mobile telephone arms respectively.

The mobile telephone support frame further includes a fixing part 4.

The main support adjusting arms further include fixing ends 12, the fixing ends are connected to one end of the mobile telephone arms; one side of the two main support adjusting arms facing the mobile telephone arms is provided with limit groove 13, and the two driven arms are located in the two limit grooves respectively.

The other end of the mobile telephone arms is provided with holding groove 21.

One end of the driven arms is connected to the mobile telephone arms, and the other end thereof is provided with gears 31, and the gears of the two driven arms are matched and connected each other, and located on the rotating ends.

The fixing part is connected to the ends of the driven arms provided with the gears and the rotating ends respectively.

The middle portions of the two mobile telephone arms are symmetrical with each other and bent towards to a symmetry axis in a braided bent shape, and the holding grooves face to the driven arms.

The limit grooves are formed as L-shape grooves, and the driven arms adjoin to the L-shape grooves.

The fixing part includes a fixing plate 41, a limit part 42 and a rotating shaft 43, the limit part and the rotating shaft are fixedly connected to the same side of the fixing plate, and one end of the rotating shaft is fixedly connected on the fixing plate, and other end thereof passes through the two rotating ends, such that the two rotating ends are connected through the rotating shaft, one end of the driven arms provided with the gears is connected to the fixing part, and the limit part is located within a rotating range of the driven arms.

The limit part is a boarding plate, and the boarding plate is fixedly mounted on an edge of the fixing plate. The boarding plate is formed as U shape, and an opening of the U shape is towards the fixing ends of the main support adjusting arms.

One end of the driven arms having gears is provided with a protrusion 32, one side of the fixing plate facing the driven arms is provided with a groove 44 matched with the protrusion, and the protrusion is mounted into the groove, such that the two driven arms are expanded respectively in a scissors form about the protrusion as an axis at the opening of U shape.

The fixing part further includes a cover plate 45, and the rotating shaft passes through the rotating end and connects to the cover plate.

The mobile telephone support frame further includes a fixing seat, and the fixing seat is detachably connected to the cover plate.

The fixing ends are connected to one end of the mobile telephone arms through locking knobs 5, and the locking knobs pass through the fixing ends and form threaded connection with one end of the mobile telephone arms.

The mobile telephone support frame of the present application can be used in an environment within the automobile, and the distance can be adjusted by pulling the mobile telephone arms, so as to place the mobile telephone. However, for the designs of related arm support frames, the two arms need to be operated separately to adjust angle and distance, thus the operations thereof are complicated. The mobile telephone support frame of the present application enables the left and right arms to simultaneously shift and to be always expanded in a parallel state, thus the operations are faster and more convenient.

The above mentioned are only some embodiments of the present invention, which are not used to limit the present invention. For a person skilled in the art, the present invention may have various changes and variations. Any modifications, equivalent substitutions, improvements etc. within the spirit and principle of the present invention shall all be included in the scope of protection of the present invention.

DESCRIPTION OF SYMBOLS

1: main support adjusting arm
11: rotating end
12: fixing end
13: limit groove
2: mobile telephone arm
21: holding groove
3: driven arm
31: gear
32: protrusion
4: fixing part
41: fixing plate
42: limit part
43: rotating shaft
44: groove
45: cover plate
5: locking knob

What is claimed is:
1. A mobile telephone support frame, comprising main support adjusting arms and mobile telephone arms con- nected with each other, the number of the main support adjusting arms and the number of the mobile telephone arms being both two, wherein the mobile telephone support frame further comprises two driven arms arranged each other symmetrically, the driven arms are located between the main support adjusting arms and the mobile telephone arms, the main support adjusting arms comprise rotating ends, the two rotating ends are rotationally connected, the two driven arms are mounted on the two main support adjusting arms respectively, one end of the two driven arms is rotationally connected, and other end thereof is connected to the two mobile telephone arms respectively.

2. The mobile telephone support frame of claim 1, wherein the mobile telephone support frame further comprises a fixing part;
the main support adjusting arms further comprises fixing ends, the fixing ends are connected to one end of the mobile telephone arms; the sides of the two main support adjusting arms facing the mobile telephone arms are provided with limit grooves, the two driven arms are located into the two limit grooves respectively;
the other end of the mobile telephone arms is provided with a holding groove;
one end of the driven arms is connected to the mobile telephone arms, the other end is provided with gears, the gears of the two driven arms are matched and connected each other, and located on the rotating ends;
the fixing part is respectively connected to the end of the driven arms provided with the gears and the rotating ends.

3. The mobile telephone support frame of claim 2, wherein the middle portions of the two mobile telephone arms are symmetrical with each other and bent towards a symmetry axis in a braided bent shape, and the holding grooves face to the driven arms.

4. The mobile telephone support frame of claim 2, wherein the limit grooves form as L-shape grooves, and the driven arms adhere to the L-shape grooves.

5. The mobile telephone support frame of claim 2, wherein the fixing part comprises a fixing plate, a limit part and a rotating shaft, the limit part and the rotating shaft are fixedly connected to the same side of the fixing plate, the one end of the rotating shaft is fixedly connected to the fixing plate, the other end thereof passed through the two rotating ends, such that the two rotating ends are connected through the rotating shaft; one end of the driven arms provided with the gears is connected to the fixing part, and the limit part is located in a rotating range of the driven arms.

6. The mobile telephone support frame of claim 5, wherein the limit part is a boarding plate, the boarding plate is fixedly mounted on an edge of the fixing plate, the boarding plate forms as U shape, and an opening of the U shape faces to the fixing ends of the main support adjusting arms.

7. The mobile telephone support frame of claim 6, wherein one end of the driven arms provided with the gears is provided with a protrusion, one side of the fixing plate facing the driven arms is provided with a groove matched with the protrusion, and the protrusion is mounted into the groove, such that the two driven arms are respectively expanded in a scissors form about the protrusion as an axis at the opening of U shape.

8. The mobile telephone support frame of claim 5, wherein the fixing part further comprises a cover plate, and the rotating shaft passes through the rotating end and connects with the cover plate.

9. The mobile telephone support frame of claim 8, wherein the mobile telephone support frame further comprises a fixing seat which is detachably connected to the cover plate.

10. The mobile telephone support frame of claim 2, wherein the fixing ends are connected to one end of the mobile telephone arms through locking knobs, and the locking knobs pass through the fixing ends and form threaded connection with one end of the mobile telephone arms.

11. A mobile telephone support frame, comprising a pair of main support adjusting arms and a pair of mobile telephone arms, each of the main support adjusting arms and mobile telephone arms are connected with each other,
wherein each of the mobile telephone support frames further comprises driven arm which is located between the main support adjusting arm and the mobile telephone arm;
each of the main support adjusting arms comprises rotating end, and each of the driven arms is mounted on the main support adjusting arms;
one end of the driven arm is rotationally connected, and other end thereof is connected to the mobile telephone arm.

12. The mobile telephone support frame of claim 11, wherein the mobile telephone support frame further comprises a fixing part which is connected to the end of the driven arm and the rotating end.

13. The mobile telephone support frame of claim 12, wherein the fixing part comprises a fixing plate, a limit part and a rotating shaft, the limit part and the rotating shaft are fixedly connected to the fixing plate, and the limit part is located in a rotating range of the driven arms within 180°.

* * * * *